US008726918B2

(12) United States Patent
Watanabe

(10) Patent No.: US 8,726,918 B2
(45) Date of Patent: May 20, 2014

(54) NANOFLUID GENERATOR AND CLEANING APPARATUS

(76) Inventor: Sadatoshi Watanabe, Tokyo (JP)

(*) Notice: Subject to any disclaimer, the term of this patent is extended or adjusted under 35 U.S.C. 154(b) by 1102 days.

(21) Appl. No.: 11/992,351

(22) PCT Filed: Feb. 2, 2006

(86) PCT No.: PCT/JP2006/301736
§ 371 (c)(1), (2), (4) Date: Jul. 17, 2009

(87) PCT Pub. No.: WO2007/034580
PCT Pub. Date: Mar. 29, 2007

(65) Prior Publication Data

US 2009/0293920 A1 Dec. 3, 2009

Related U.S. Application Data

(60) Provisional application No. 60/719,937, filed on Sep. 23, 2005.

(51) Int. Cl.
*B08B 3/10* (2006.01)
*B01D 47/00* (2006.01)

(52) U.S. Cl.
USPC .................. 134/102.2; 134/102.1; 261/119.1

(58) Field of Classification Search
USPC ............... 134/94.1, 100.1, 102.1, 102.2, 902; 261/83, 85, 86, 119.1
See application file for complete search history.

(56) References Cited

U.S. PATENT DOCUMENTS

| | | | | |
|---|---|---|---|---|
| 6,209,855 | B1 * | 4/2001 | Glassford | 261/28 |
| 6,994,330 | B2 * | 2/2006 | Holl | 261/92 |
| 7,213,642 | B2 * | 5/2007 | Kerfoot | 166/105.5 |
| 7,649,024 | B2 * | 1/2010 | Li et al. | 516/33 |
| 7,806,584 | B2 * | 10/2010 | Wootan et al. | 366/170.3 |
| 7,981,286 | B2 * | 7/2011 | Higuchi et al. | 210/221.2 |
| 2006/0054205 | A1 * | 3/2006 | Yabe et al. | 134/184 |

FOREIGN PATENT DOCUMENTS

| | | | |
|---|---|---|---|
| DE | 34 11 865 | * | 10/1985 |
| JP | 63-016035 | * | 1/1988 |
| JP | 02-211232 | * | 8/1990 |
| JP | 08-229371 | * | 9/1996 |

(Continued)

OTHER PUBLICATIONS

International Search Report (PCT/JP2006/301736).

*Primary Examiner* — Michael Barr
*Assistant Examiner* — Benjamin L Osterhout
(74) *Attorney, Agent, or Firm* — Darius Gleason

(57) ABSTRACT

The present invention provides: a nanofluid generating apparatus that has relatively simple construction, is capable of stably generating nanobubbles, is easy to handle and makes it possible to reduce manufacturing cost; and a cleaning apparatus that uses nanofluid. An apparatus for generating nanofluid containing nanobubbles, wherein the nanobubbles are gas bubbles with diameter less than 1 μm, comprising: a gas-liquid mixing chamber 7 for mixing gas and liquid; and a pressurization pump 4 and an air intake valve 21 for supplying the pressurized gas and liquid to the gas-liquid mixing chamber, wherein the gas-liquid mixing chamber comprises therein:

a turbulence generating means Z having projecting lines 9 and grooves 10, 12, and a conical section 11, for forcibly mixing the supplied gas and liquid by generating turbulence therein; and a nano-outlet 20 for turning the forcibly mixed gas and liquid mixture into nanofluid having nano bubbles and discharging the nanofluid.

16 Claims, 2 Drawing Sheets

(56) References Cited

FOREIGN PATENT DOCUMENTS

| | | | |
|---|---|---|---|
| JP | 2000-185277 | * | 7/2000 |
| JP | 2002-143885 A | | 5/2002 |
| JP | 2003-334548 A | | 11/2003 |
| JP | 2004-121962 A | | 4/2004 |
| JP | 2005-095877 | * | 4/2005 |
| JP | 2005-245817 A | | 9/2005 |
| JP | 2005-246294 A | | 9/2005 |
| JP | 2005-246351 | * | 9/2005 |
| KR | 2002089647 | * | 11/2002 |
| RU | 1 277 456 | * | 12/2001 |

* cited by examiner

NANOFLUID GENERATOR AND CLEANING APPARATUS

CROSS REFERENCE TO RELATED APPLICATIONS

This application claims priority under 35 U.S.C. 119 based upon U.S. Provisional Application No. 60/719,937, filed on Sep. 23, 2005. The entire disclosure of which is incorporated herein by reference.

FIELD OF THE INVENTION

The present invention relates to a nanofluid generating apparatus that generates a nanofluid containing nanobubbles, which are gas bubbles having a diameter of less than 1 μm; and a cleaning apparatus that cleans an object being processed using the nanofluid that is generated by the nanofluid generating apparatus.

BACKGROUND OF THE INVENTION

In general, submicroscopic gas bubbles with diameter less than 1 μm (1000 nm) are called "nanobubbles," whereas microscopic gas bubbles with diameter equal to or greater than 1 μm are called "microbubbles." The nanobubbles and microbubbles are distinguished from each other.

Patent Document 1 describes microscopic gas bubbles (microbubbles) characterized for having diameter less than about 30 μm upon their generation at normal pressures; gradually miniaturizing over a predetermined lifespan; and vanishing or dissolving thereafter.

The Patent Document 1 also describes examples and their results of applying the microbubble characteristics such as gas-liquid solubility, cleaning function or bioactivity enhancement to improve water quality in closed bodies of water such as a dam reservoir, enhance the growth of farmed fish and shellfish or hydroponic vegetables and the like, and sterilization or cleaning of organisms.

Patent Document 2 describes a method for generating nanobubbles with diameter less than 1 μm by decomposing part of liquid therewithin. Also Patent Document 3 describes a method and an apparatus for cleaning objects using nanobubble-containing water.

Patent Document 4 describes a method for producing nanobubbles by applying physical stimulation to microbubbles in liquid to thereby rapidly reduce the bubble size. Furthermore, Patent Document 5 describes a technology according to oxygen nanobubble water consisting of an aqueous solution comprising oxygen-containing gas bubbles (oxygen nanobubbles) with 50-500 nm diameter, and a method to produce the oxygen nanobubble water.

As described above, nanobubbles have not only the microbubble functionalities, but also excellent engineering functionalities to directly affect organisms in their cellular level, allowing a broader range of applications, such as semiconductor wafer cleaning and dermatosis treatment, than that of microbubbles and nanobubbles are expected to have even higher functionalities in the future.

Patent Document 1: JP-A-2002-143885

Patent Document 2: JP-A-2003-334548

Patent Document 3: JP-A-2004-121962

Patent Document 4: JP-A-2005-245817

Patent Document 5: JP-A-2005-246294

It has been verified that the nanobubbles described above are generated instantaneously when microbubbles collapse in the water, and are known for their extremely unstable physical characteristics. Therefore it is difficult to put nanobubbles to practical use by stably producing and retaining them for an extended period of time.

For this reason, the Patent Document 3 is suggesting to generate nanobubbles by applying ultrasonic waves to decomposed and gasified solution. However, ultrasonic generators are expensive, large-sized and difficult to use and perform matching, prohibiting their wide use.

Also the Patent Document 1 discloses a method and an apparatus for generating microbubbles by force feeding liquid into a cylindrical space in its circumferential direction to create a negative pressure region, and having the negative pressure region absorb external gas. However, this apparatus only generates microbubbles, and does not stably produce nanobubbles with smaller diameter.

SUMMARY OF THE INVENTION

In order to solve the problems described above, the object of the present invention is to provide: a nanofluid generating apparatus that has relatively simple construction, is capable of stably generating nanobubbles, is easy to handle and makes it possible to reduce manufacturing costs; and a cleaning apparatus that uses nanofluid to clean an object being processed.

In order to achieve the above objective, there is provided an apparatus for generating nanofluid containing nanobubbles, wherein the nanobubbles are gas bubbles with diameter less than 1 μm, comprising:

a gas-liquid mixing chamber for mixing gas and liquid; and a pressurization means for applying pressure to the gas and liquid and supplying the pressurized gas and liquid to the gas-liquid mixing chamber, wherein the gas-liquid mixing chamber comprises therein:

a turbulence generating means for forcibly mixing the supplied gas and liquid by generating turbulence therein; and a nano-outlet for discharging the gas-liquid mixture fluid.

In addition, in order to achieve the above objective, a cleaning apparatus of the present invention uses nanofluid that is generated in the apparatus for generating nanofluid as the cleaning processing solution, when an object of treatment is submerged in the processing tank and the surface of the object is cleaned.

The present invention has the advantages of having relatively simple construction, being capable of stably generating nanofluid, being easy to handle, and being able to reduce manufacturing costs.

Furthermore, the present invention has the advantage of achieving improved cleaning efficiency by cleaning an object being processed using nanofluid.

DETAILED DESCRIPTION OF THE INVENTION

The preferred embodiments of the present invention are explained below based on the accompanying drawings.

Figure 1A:
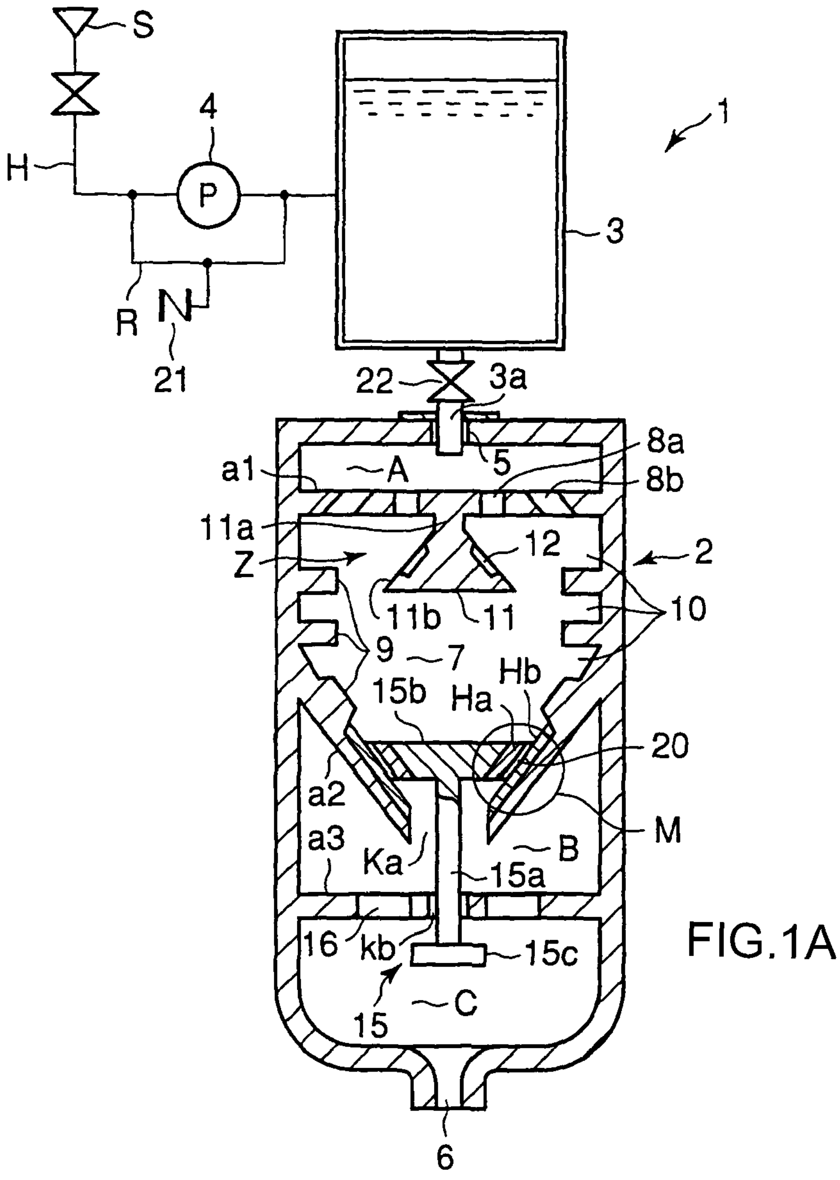
FIG. 1 is a schematic diagram and a partial enlarged view of an embodiment of the present invention.
Figure 1B:
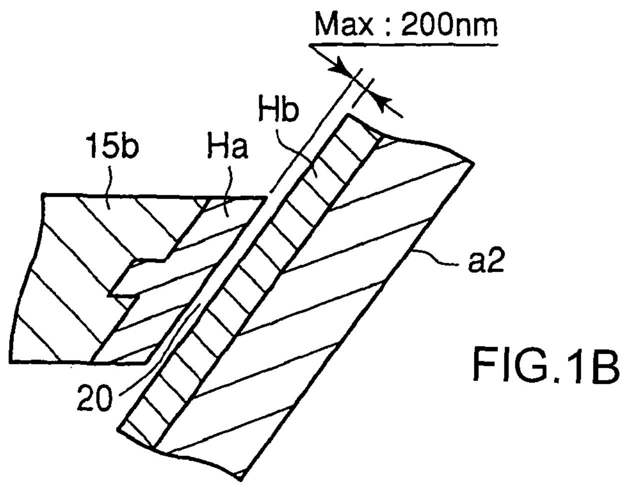

FIG. 1A is a schematic cross-sectional view of a nanofluid generating apparatus 1 according to one embodiment of the present invention; FIG. 1B is a fragmentary sectional view showing an enlarged key portion M, which is circled in FIG. 1A.

The nanofluid generating apparatus 1 is composed of a generator 2, a holding tank 3, a pressurization pump (pressurization means) 4, and a piping H in communication with the generator 2 from a water supply source through the pressurization pump 4 and the holding tank 3.

A water purifying apparatus 23 is provided on the piping H between the water supply source S and the pressurization pump 4 for purifying water received from the water supply source S and supplying the purified water to the pressurization pump 4. The pressurization pump 4 may withdraw purified water from the water purifying apparatus (not shown), pressurize the purified water under 13-15 atm (13-15 times the atmospheric pressure), and send the pressurized purified water to the holding tank 3.

A bypass circuit R branches off from the piping H upstream and downstream of the pressurization pump 4. the bypass circuit R is provided with an air intake valve (air inlet means) 21, which is a check valve for introducing the external air into the bypass circuit R by being opened upon actuation of the pressurization pump 4.

To explain, the operation of the pressurization pump 4 causes a pressure difference to occur between the pressure on the upstream side and the downstream side of the pressurization pump 4, and air (fresh air) that is taken in from the air intake valve 21 is mixed with the pure water that is pressurized by and fed from the pressurization pump 4, then in this state, the mixture is supplied to the holding tank 3.

When the pressurization capacity of the pressurization pump 4 is 13 to 15 atm, the intake amount of the air intake valve 21 is set to about 1 to 3 liters per minute.

The holding tank 3 would store therein pressurized purified water and air in a predetermined ratio, and the storage capacity of the holding tank 3 is changed according to, for example, the type of nanofluid generated and the nanofluid generation capacity of the generator 2.

For example, when generating fluid consisting of the purified water and the air, the pressurization capacity of the pressurization pump 4 is set to 13-15 atm, and the nanofluid generation capacity is set to 40-60 liters per minute, the holding tank 3 capacity of 12-15 liters is large enough.

Also, when modifying water stored in a bathtub or a pool into nanofluid, 1-2 tons of water may be processed per minute by replacing the water supply source S with the bathtub or the pool, and storing in the holding tank 3 and also circulating the nanofluid-containing water generated by the present apparatus.

The generator 2 is a cylindrical body with its central axis extending vertically, and is formed of a material with superior pressure resistance and water resistance such as stainless steel. Both top and bottom surfaces of the generator 2 are closed to complete; the top surface is provided with an inlet 5 and the bottom surface is provided with an outlet 6.

Provided inside the generator 2 are a first bulkhead plate a1, a second bulkhead plate a2, and a third bulkhead plate a3 for axially separating compartments with predetermined intervals. The internal space from the top surface, on which the inlet 5 is provided, to the first bulkhead plate a1 is called a partition space A, and the internal space from the first bulkhead plate a1 to the second bulkhead plate a2 is called a gas-liquid mixing chamber 7.

The internal space from the second bulkhead plate a2 to the third bulkhead plate a3 is called a valve chest B, and the internal space from the third bulkhead plate a3 to the bottom surface, on which the outlet 6 is provided is called a discharge space section C. The above internal spaces A, 7, B and C are configured as follows.

An inlet body 3*a* comprising a supply valve 22 is projectingly provided at the bottom of the holding tank 3, and the supply valve 22 and part of the inlet body 3*a* are inserted into the inlet 5, which is provided at the top of the generator 2, using an airtight structure. An open end of the inlet body 3*a* protrudes into the partition space A inside the generator 2.

Provided through the first bulkhead plate a1 are two sets of communication bores (through-holes), first communication bores 8*a* and second communication bores 8*b*, wherein upper ends of each set of the communication bores are positioned concentrically on a circumference of a circle with a unique diameter about the central axis, wherein bores are spaced apart with predetermined intervals. The first communication bores 8*a* are located near the central axis of the generator 2 and vertically (axially) provided. The second communication bores 8*b* are located near the circumference of the generator 2 and obliquely provided with their lower ends having a larger diameter than a diameter of the upper ends.

Accordingly, fluid passing through the first communication bores 8*a* near the central axis flows down vertically, and fluid passing through the second communication bores 8*b* near the circumference flows down outward. The partition space A is in communication with the gas-liquid mixing chamber 7 through the first communication bores 8*a* and the second communication bores 8*b*.

Inside the gas-liquid mixing chamber 7, a conical member 11, which is an integral part of the generator 2, is vertically provided from the center of the lower surface of the first bulkhead plate a1, wherein the central axes of the conical member 11 and the generator 2 align with each other. A rod section 11*a*, the upper part of this conical member 11, is in a simple rod shape attached to the lower surface of the first bulkhead plate a1, and a conical section 11*b*, the lower part of the conical member 11, is flared into a segmented conical shape.

Part of the conical member 11, especially around the surface of the conical section 11*b*, is located directly underneath the first communication bores 8*a*, which are provided through the first bulkhead plate a1 near its central axis. Fluid passing the vertically provided first communication bores 8*a* flows down vertically and is received by the flared surface of the conical section 11*b* of the conical member 11.

The conical member 11 is provided with grooves 12 on the surface of the conical section 11*b* of the conical member 11. These grooves 12 are preferably provided in a plurality of elongated grooves with different depths rather than provided horizontally on the perimeter of the conical section 11*b*.

On the other hand, a plurality of projecting lines 9 and grooves 10 are axially and alternately provided on the inner surface of the gas-liquid mixing chamber 7. The projecting lines 9 and the grooves 10 are both provided on the inner surface of the generator 2 and are stratified. The second communication bores 8*b* are respectively angled outward towards their lower openings, ensuring that fluid passing therethrough flows down outward and is guided to the projecting lines 9 or the grooves 10.

The cross-sectional shape of the second bulkhead plate a2 is tapered downwardly from the inner surface of the generator 2 toward its central axis, and the lower end of the second bulkhead plate a2 is open and creating a funnel shape. Through this opening Ka, the gas-liquid mixing chamber 7 and the valve chest B communicate with each other.

A projecting line 9 is also provided on the upper surface of the second bulkhead plate a2, wherein the upper surface is facing the gas-liquid mixing chamber 7. This projecting line 9 is provided particularly on the top section of the second bulkhead plate a2, forming a groove 10 similar to the above-described grooves 10 between the projecting line 9 on the top section of the second bulkhead plate a2 and the lowest projecting line 9 on the inner surface of the gas-liquid mixing chamber 7.

In this manner, a turbulence generating mechanism (turbulence generating means) Z is constructed with features such as the projecting lines 9 and the grooves 10 on the inner surface of the generator 2 and on the second bulkhead plate a2 in the gas-liquid mixing chamber 7; and the conical section 11*b* and the grooves 12 thereon.

It should be noted that the respective locations and sizes of the projecting lines 9 and the grooves 10 provided on the inner surface of the generator 2 and the second bulkhead plate a2 (turbulence generating mechanism Z), the diameter and taper angle of the conical section 11*b* of the conical member 11, the depth of the grooves 12 on the conical section 11*b* and the like are all freely configured according to, for example, the type, generation speed and pressure of generated nanofluid.

For example, the height of the projecting lines 9 and the depth of the grooves 10 and 12 may be both set to 5 mm (i.e., up to 10 mm height difference). Similarly, the internal volume of the gas-liquid mixing chamber 7, the respective numbers and diameters of the first and second communication bores 8*a* and 8*b* on the first bulkhead plate a1, the cross-sectional diameter of the generator 2 and the like are also freely configured according to, for example, the type, generation speed and pressure of generated nanofluid.

Provided on the upper surface of the second bulkhead plate a2 under its projecting line 9 is a polished surface with platinum chips attached thereon for ensuring high smoothness, and this smooth surface constructs a first smooth surface section Ha. Thus, the upper surface of the second bulkhead plate a2, except where the projecting line 9 is located, is formed to be an extremely smooth surface by the first smooth surface section Ha.

A platinum material was selected for its superior polishability; in general a stainless steel material used for the generator 2, and other metal materials are physically limited to achieve smooth-enough surfaces by polishing in order to configure a desirable channel width value as discussed below. In contrast, platinum materials allow for a nearly ultimate surface smoothness precision for forming the channel in desired sizes.

The opening Ka is the lower end of the first smooth surface section Ha and a stop valve body 15 is passed through this opening Ka. The stop valve body 15 consists of a rod section 15*a* passed through the opening Ka of the second bulkhead plate a2 and a opening Kb provided along the central axis of the third bulkhead plate a3; a valve section 15*b* provided integrally with and continuously to the rod section 15*a* at the upper end thereof; and a stopper section 15*c* provided integrally with and continuously to the rod section 15*a* at the lower end thereof.

The diameter of the rod section 15*a* of the stop valve body 15 is smaller than both the diameter of the opening Ka of the second bulkhead plate a2 and the diameter of the opening Kb of the third bulkhead plate a3. In addition, the dimensions of the stop valve body 15 are configured such that the valve section 15*b* is positioned over the upper surface of the second bulkhead plate a2, and such that the stopper section 15*c* is positioned inside the discharge space section C under the third bulkhead plate a3, therefore the valve section 15*b* mounts over the angled upper surface of the second bulkhead plate a2, bearing the entire weight of the stop valve body 15.

Further, the perimeter of the valve section 15*b* is tapered with the same angle as the taper angle of the upper surface of the second bulkhead plate a2, has a predetermined axial length (thickness), and is in close contact with the first smooth surface section Ha formed on the second bulkhead plate a2.

Polished and highly smoothened platinum chips are attached to the perimeter of the valve section 15*b*, constructing a second smooth surface section Hb. As such, the second bulkhead plate a2 and the stop valve body 15 are in close contact with the first and second smooth surface sections Ha and Hb facing each other.

In practice, an extremely narrow gap is naturally formed between the first smooth surface section Ha of the second bulkhead plate a2 and the second smooth surface section Hb of the stop valve body 15. As previously mentioned, stainless steel and other metal materials in general have physical limitations to achieve smooth surfaces by polishing, creating a gap of several tens of μm in width between two smoothened surfaces made thereof no matter how closely they are attached to each other.

In contrast, when using platinum materials to form two extremely smoothened surface sections in close contact with each other, the gap between the surfaces may be minimized to the order of nanometer. Here, as shown in FIG. 1B, the gap (hereinafter referred to as "nano-outlet 20") between the first and second smooth surface sections Ha and Hb, both made of the platinum material, may be narrowed down to a nano-scale width of about 0.2 μm (200 nm) at maximum.

In the third bulkhead plate a3, a plurality of bores (through-holes) 16 are provided around the opening Kb, through which the rod section 15*a* of the stop valve body 15 passes, allowing the valve chest B and the discharge space section C to communicate with each other. The outlet 6, provided at the bottom of the generator 2, is adapted to connect with a piping in communication with an nano fluid supply unit (not shown).

In the nanofluid generating apparatus that is constructed in this way, by driving the pressurization pump 4, pure water is directed from the water supply S via a pure-water generating apparatus, air is directed from the air intake valve 21 via a bypass circuit R, and both the pure water and the air are supplied to the holding tank 3 in a pressurized state. The holding tank 3 has the function of stabilizing the ratio of gas to fluid and the pressure of the pressurized gas-liquid mixture fluid that accumulates therein.

The pressurized purified water-air mixture fluid, i.e., the gas-liquid mixture fluid stays in the holding tank 3 until its volume increases to a predetermined level inside the holding tank 3, which then opens the supply valve 22 provided at the inlet body 3*a*. The pressurized gas-liquid mixture fluid with the predetermined relative ratio is supplied through the inlet 5 to the decomposition space section A, which is formed as the top partition inside the generator 2.

Once filling the decomposition space section A, the pressurized gas-liquid mixture fluid flows down the first communication bores 8*a* and the second communication bores 8*b* to be guided into the gas-liquid mixing chamber 7. In this manner, the decomposition space section A may supply and guide uniformly pressurized gas-liquid mixture fluid into the gas-liquid mixing chamber 7.

The gas-liquid mixture fluid passing through the first communication bores 8*a* falls down on and bounces off the upper surface of the conical section 11*b* or the grooves 12 thereon of the conical section 11*b* directly beneath the first communication bores 8*a*. Naturally, the bounce-off angle of gas-liquid mixture fluid droplets bounding off the conical section 11*b*, and the bounce-off angle of the droplets bounding off the grooves 12 are different from each other.

Thus, after bouncing off the conical member 11 as described above, the droplets collide against the lower surface of the first bulkhead plate a1 at different positions, further rebounding with different angles. Due to the outward angles of the second communication bores 8*b*, the pressurized gas-liquid mixture fluid passing through the bores 8*b* falls down outwardly on and bounces off the projecting lines 9 or the grooves 10, which are axially provided on the inner surface of the gas-liquid mixing chamber 7.

The gas-liquid mixture fluid droplets colliding against the projecting lines 9 or the grooves 10 bounce off with different angles, further repeating many collisions against the first bulkhead plate a1, the conical member 11, other projecting lines 9 and grooves 10 and other components of the turbulence generating mechanism Z, while flowing downward.

The gas-liquid mixture fluid that is directed in a pressurized state in this way to the gas-liquid mixing chamber 7 is scattered in random directions due to the internal shape of a turbulence generating mechanism Z that is provided in the gas-liquid mixing chamber 7, causing the turbulent state to continue. Moreover, bounce off is repeated as collisions occur at various sites, however, as collisions continue, mixing of the gas-liquid mixture forcibly proceeds in the pressurized state.

Still pressurized, the gas-liquid mixture fluid in the turbulent state and forcibly mixed in the gas-liquid mixing chamber 7 is forced to pass through the nano-outlet 20, the gap between the first smooth surface section Hb on the second bulkhead plate a2 and the second smooth surface section Ha on the vb15 of the stop valve body 15.

By forcibly causing the gas-liquid mixture fluid to pass through the nano-outlet 20, the gas-liquid mixture fluid changes to a nanofluid that contains a large amount of nanobubbles, and is delivered to the valve chest B. The particle size of the obtained nanofluid that contain nanobubbles is 0.2 μm (200 nm), which is the same as the width of the nano-outlet 20. As the nanofluid is generated, the liquid (pure water) itself is decomposed into minute clusters on the nano level, so it is possible to dramatically improve the absorbability of the fluid.

The nanofluid that is directed into the valve chest B is gradually directed from the valve chest B through a plurality of bores 16 to a discharge space section C and fills that discharge space section C. The discharge space section C temporarily holds and stabilizes the nanofluid, then supplies the nanofluid to a specified supply destination from an outlet 6.

In this way, while the nanofluid generating apparatus 1 is an apparatus having simple construction, it is also capable of stably generating nanofluid that contains 0.2 μm (200 nm) sized nanobubbles from pure water and air, is easy to handle, and is capable of reducing manufacturing costs.

It should be noted that the present invention is not limited to the above embodiment and may be embodied with various modifications made to its components without departing from the spirit and scope of the present invention. Thus, appropriate combinations of the plurality of components disclosed as in the above embodiment enables various further inventions.

For example, the holding tank 3 interposed between the pressurization pump 4 and the generator 2 may be omitted to supply the pressurized gas-liquid mixture fluid from the pressurization pump 4 and the air intake valve 21 directly to the generator 2.

Alternatively, pressurized liquid and pressurized gas may be separately supplied into the generator 2 for mixing as well as achieving the turbulent state therein. In this case, it takes a relatively long time (several tens of seconds to several minutes) until the pressure and gas-liquid relative ratio stabilize in the generator 2 after supplying the pressurized liquid and the pressurized gas separately into the generator 2, although once its contents are stabilized, this apparatus may continuously generate nanofluid as in the embodiment provided with the holding tank 3.

Although the above-described embodiment comprises the conical member 11 as an internal structure of the gas-liquid mixing chamber 7 along its central axis, and the projecting lines 9 and the grooves 10 axially and alternately provided on the inner surface of the generator 2, the present invention is not limited to this configuration and, for example, a plurality of plate bodies having guiding bores may be disposed with a predetermined interval, wherein positions of the guided bores may vary on each plate body.

The respective guiding bores in adjacent plate bodies do not align with one another, making these plate bodies so called "baffle plates" for the fluid to allow its gas-liquid mixing. Alternatively, mesh bodies with different fineness may be provided instead of the plate bodies to achieve similar operational advantage. However, the mesh bodies need to be rigid enough to resist a pressure applied by the gas-liquid mixture fluid, which is pressurized before guided into the gas-liquid mixing chamber 7. The key is to employ a structure which efficiently allows to generate a turbulent state of the gas-liquid mixture fluid in the gas-liquid mixing chamber 7.

Although the nano-outlet 20 in the above-disclosed embodiment is a nano-scale gap naturally formed between the first and second smooth surface sections Ha and Hb, which are in close contact with each other and made of platinum chips, other metal materials may be used in place of platinum if they allow a nano-scale outlet width with special polishing technologies or improved coating technologies.

Moreover, the fluid to be nanotized is not limited to pure water or air, and depending on the use, various fluids or gasses (for example, ozone, oxygen, etc.) can be used.

Next, the cleaning apparatus 30 that receives the nanofluid that is supplied from the nanofluid generating apparatus 1 and cleans a body W that is being processed will be explained.

Figure 2:
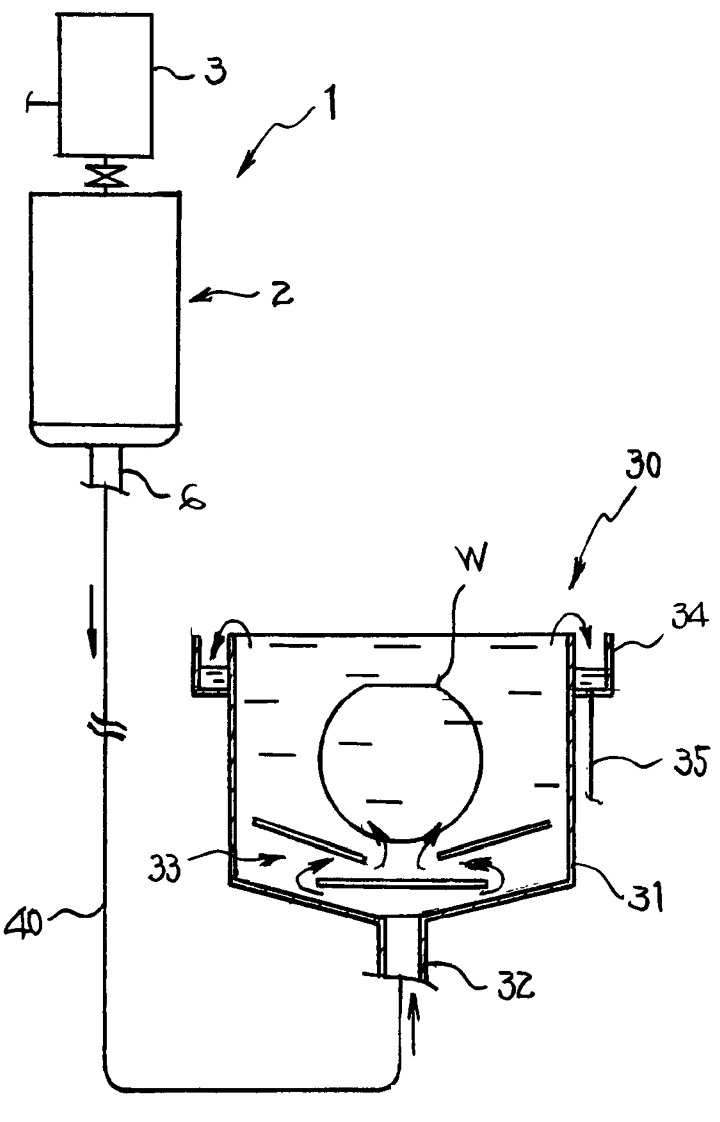
FIG. 2 is a drawing showing the construction of the cleaning apparatus of an embodiment of the present invention that is connected to the nanofluid generating apparatus by way of piping.

FIG. 2 is a drawing showing the construction of the cleaning apparatus 30 that is connected to the nanofluid generating apparatus 1 by way of piping 40.

A processing tank 31 is provided as a cleaning apparatus 30. This processing tank 31 is constructed such that it uses a drop, for example, to receive nanofluid from the nanofluid generating apparatus 1, and is located at a location that is lower than the nanofluid generating apparatus 1. An inlet 32 is provided in the bottom section of the processing tank 31, and this inlet 32 is connected to the outlet 6 of the nanofluid generating apparatus 1 via an inlet pipe 40.

In the case where it is not possible to maintain this kind of drop due to the installation space, it is possible to arrange the cleaning apparatus 30 close to the side of the nanofluid generating apparatus 1 and provide a pump midway along the inlet pipe 40 that connect the inlet 32 of the cleaning apparatus 30 with the outlet 6 of the nanofluid generating apparatus 1 and to supply the nanofluid from the nanofluid generating apparatus 1 to the cleaning apparatus 30.

A rectifying mechanism 33 is provided inside the processing tank 31 so that a plurality of horizontal or inclined plate sections are located such that they face the inlet 32, and so that only some face each other.

This rectifying mechanism 33 performs the function of rectifying the nanofluid that is supplied from the inlet 32 and directing it to the center of the processing tank 31. In addition, the object W that is being processed is supported by a supporting mechanism (not shown in the figure) so that it is housed in the center on the inside of the processing tank 31 at a location that faces the rectification direction of the rectifying mechanism 33. Here, for example, the object W being processed is a semiconductor wafer (hereafter, simply referred to as a 'wafer').

The supporting mechanism supports a plurality of wafers W in a row with a small space between each, and transports these wafers W by freely moving them up or down between the inside of the processing tank 31 and outside of the processing tank 31. Naturally, when transporting the wafers W, the supporting mechanism secures the position of the wafers W and keeps them from moving. On the outside of the processing tank 31, the wafers W can be freely removed from the supporting mechanism, and construction is such that setting the wafers on the supporting mechanism can be performed easily.

An overflow tank 34 is provided around the entire outer surface on the upper end of the processing tank 31, and a drainage pipe 35 that is connected to a drainage unit (not shown in the figure) is connected to the bottom section of this overflow tank 34.

Nanofluid is continuously supplied to the processing tank 31 from the nanofluid generating apparatus 1 so that the processing tank 31 is constantly filled with nanofluid. Only the continuously supplied amount of nanofluid spills over as overflow from the processing tank 31 to the overflow tank 34, and is drained to the outside via the drainage pipe 35.

As the wafers W that are supported by the supporting mechanism are moved from the outside and become housed inside the processing tank 31, a large amount of nanofluid spills over from the processing tank 31 into the overflow tank 34, and this overflow tank 34 receives all of the overflow so that none of the nanofluid flows directly to the outside from the processing tank 31.

In the cleaning apparatus 30 that is constructed in this way, the wafers W that are supported by the supporting mechanism are moved into the processing tank 31. Nanofluid that contains nanobubbles has already been supplied to the processing tank 31 such that the processing tank 31 is full, so all of the wafers W are immersed in the fluid.

The nanofluid that contains nanobubbles is continuously directed from the outlet 6 of the nanofluid generating apparatus 1, through the inlet pipe 40 and inlet 32 and into the processing tank 31. In the processing tank 31, the nanofluid is rectified by the rectifying mechanism 33 such that it is evenly directed at and concentrated on all of the wafers W that are supported by the supporting mechanism, and supplied for the wafer W cleaning process.

For example, even when a minute particle (impurity) is strongly adhered to a wafer W, the nanobubbles that are contained in the nanofluid enter in and become located between the wafer W and the particle and peel the particle from the wafer W. Similarly, all of the particles are forcibly peeled from the wafers W by the nanobubbles that are contained in the nanofluid, making it possible to maintain an extremely high level of efficiency for cleaning the wafers W.

The cleaning apparatus 30 comprises a supporting mechanism that moves a plurality of wafers W into and out of the processing tank 31, however, this supporting mechanism could also further improve the efficiency of cleaning the wafers W by having a function of rotating the wafers W or moving the wafers W back and forth inside the processing tank 31.

Furthermore, a rectifying mechanism 33 is provided inside the processing tank 31, however, the invention is not limited to this, and instead of a rectifying mechanism 33, or in addition to a rectifying mechanism 33, it is possible for the processing tank 31 to comprise a jet mechanism that forcibly shoots out nanofluid at the wafers W.

Moreover, instead of a processing tank 31, a so-called shower mechanism could be provided that simply showers the wafers W with nanofluid to clean the wafers W.

Also, wafers where used as the object W being processed, however, the invention is not limited to this, and of course it is also possible to apply the invention to a cleaning apparatus for cleaning LCD glass boards, an etching apparatus and the like.

What is claimed is:

1. An apparatus for generating nanofluid containing nanobubbles, wherein the nanobubbles are gas bubbles with diameter less than 1 μm, comprising:
- a gas-liquid mixing chamber for mixing gas and liquid; and
- a pressurization means for applying pressure to the gas and liquid and supplying the pressurized gas and liquid to the gas-liquid mixing chamber,
- wherein the gas-liquid mixing chamber comprises therein:
- a turbulence generating means for forcibly mixing the supplied gas and liquid by generating turbulence therein; and
- a nano-outlet for discharging the gas-liquid mixture fluid;
- wherein the gas-liquid mixing chamber and the nano-outlet are provided within a generator consisting of a cylindrical body; supply bores are provided in an upper portion of the gas-liquid mixing chamber for introducing the pressurized gas-liquid mixture fluid; and the nano-outlet is provided in a lower portion the gas-liquid mixing chamber.

2. The apparatus as claimed in claim 1, further comprising:
- a holding tank interposed between the pressurization means and the gas-liquid mixing chamber for collecting and temporarily storing the pressurized gas-liquid mixture fluid to thereby stabilize the gas-liquid ratio and the pressure applied the gas-liquid mixture fluid.

3. The apparatus as claimed in claim 1, wherein the turbulence generating means provided in the gas-liquid mixing chamber is at least one of a conical section, a plurality of projecting lines and a plurality of grooves, all of which are for receiving the pressurized gas-liquid mixture fluid supplied from the pressurization means and bouncing the fluid off to random directions.

4. The apparatus as claimed in claim 1, wherein the nano-outlet is formed of a platinum material with a polished smooth channel surface.

5. The apparatus as claimed in claim 1, wherein the nano-outlet consists of a gap formed between two members in close contact with each other.

6. The apparatus as in claim 1, wherein the generator is provided with a partition space section between the supply bores and the gas-liquid mixing chamber for uniformly distributing and guiding the pressurized gas-liquid mixture fluid from the supply bores into the gas-liquid mixing chamber.

7. The apparatus as in claim 1, wherein the generator is provided with a discharge space section for collecting and temporarily storing the nanofluid discharged from the nano-outlet to thereby discharge and guide the nanofluid in a stabilized state.

8. The apparatus as in claim 7, wherein the nanofluid consists of purified water and air, or otherwise various liquid according to its application and gas such as ozone or oxygen.

9. The apparatus as claimed in claim 1, wherein the nanofluid consists of purified water and air, or otherwise various liquid according to its application and gas such as ozone or oxygen.

10. A cleaning apparatus for immersing an object of treatment in a cleaning processing solution housed in a processing tank to thereby clean the surface of the object, wherein the cleaning processing solution comprises the nanobubble-containing nanofluid generated by the apparatus as in claim 9.

11. A cleaning apparatus for immersing an object of treatment in a cleaning processing solution housed in a processing tank to thereby clean the surface of the object, wherein the cleaning processing solution comprises the nanobubble-containing nanofluid generated by the apparatus as claimed in claim 1.

12. An apparatus for generating nanofluid containing nanobubbles, wherein the nanobubbles are gas bubbles with diameter less than 1 μm, comprising:

a pressurization means for applying pressure to liquid and supplying the pressurized liquid;

an air inlet means for drawing gas in with a pressure difference between the upstream and downstream of the pressurization means upon actuation thereof and introducing the gas into the liquid;

a gas-liquid mixing chamber comprising a turbulence generating means for introducing pressurized gas-liquid mixture fluid supplied from the pressurization means and the air inlet means; and generating turbulence in the gas-liquid mixture fluid by guiding the gas-liquid mixture fluid into repeated bouncing into random directions; and a nano-outlet, provided in an exit side of the gas-liquid mixing chamber, for forcibly releasing the gas-liquid mixture fluid from nano-scale space to thereby convert the gas-liquid mixture fluid into the nanofluid containing the nanobubbles and discharge the nanofluid to outside of the gas-liquid mixing chamber:

wherein the gas-liquid mixing chamber and the nano-outlet are provided within a generator consisting of a cylindrical body; supply bores are provided in an upper portion of the gas-liquid mixing chamber for introducing the pressurized gas-liquid mixture fluid; and the nano-outlet is provided in a lower portion the gas-liquid mixing chamber.

13. The apparatus as in claim 12, further comprising:

a holding tank interposed between the pressurization means and the gas-liquid mixing chamber for collecting and temporarily storing the pressurized gas-liquid mixture fluid to thereby stabilize the gas-liquid ratio and the pressure applied the gas-liquid mixture fluid.

14. The apparatus as in claim 12, wherein the turbulence generating means provided in the gas-liquid mixing chamber is at least one of a conical section, a plurality of projecting lines and a plurality of grooves, all of which are for receiving the pressurized gas-liquid mixture fluid supplied from the pressurization means and bouncing the fluid off to random directions.

15. The apparatus as in claim 12, wherein the nano-outlet is formed of a platinum material with a polished smooth channel surface.

16. The apparatus as in claim 12, wherein the nano-outlet consists of a gap formed between two members in close contact with each other.

* * * * *